Dec. 10, 1968 N. W. CARTER 3,415,731
GLASS ELECTRODES AND METHOD FOR PRODUCING THE SAME
Filed Sept. 27, 1965
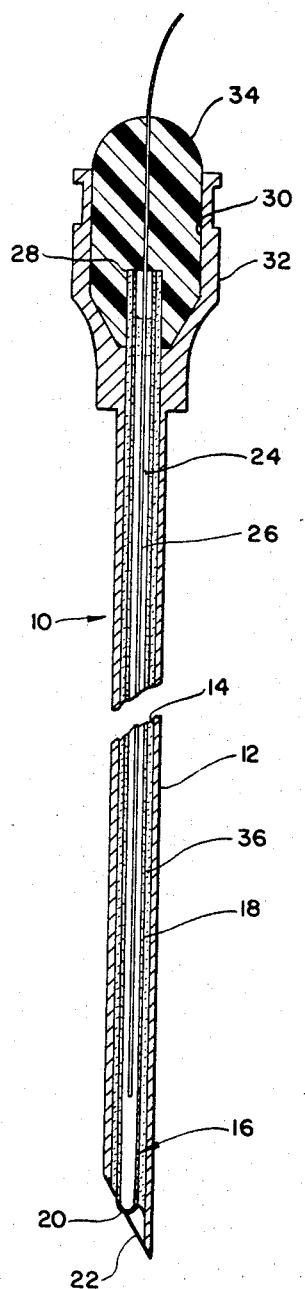
INVENTOR.
NORMAN W. CARTER
BY
ATTORNEY

United States Patent Office 3,415,731
Patented Dec. 10, 1968

3,415,731
GLASS ELECTRODES AND METHOD FOR
PRODUCING THE SAME
Norman W. Carter, Dallas, Tex., assignor to Beckman
Instruments, Inc., a corporation of California
Continuation-in-part of application Ser. No. 429,145,
Jan. 29, 1965. This application Sept. 27, 1965, Ser.
No. 490,504
21 Claims. (Cl. 204—195)

ABSTRACT OF THE DISCLOSURE

A cation sensitive glass electrode with a selected area thereof coated with an insulating glaze which has high electrical and chemical resistance. The electrode may be incorporated in a hypodermic needle. The glaze is preferably a lead borosilicate titanium composition.

---

This application is a continuation-in-part of my copending application entitled "Improvements in Glass Electrodes and Method for Producing the Same," Ser. No. 429,145, filed Jan. 29, 1965, now abandoned, and assigned to the assignee of the present application.

This invention relates to improvements in cation sensitive glass electrodes and methods of producing the same and, more particularly, to cation sensitive glass electrodes having selected areas coated with an insulating material and to methods for producing such electrodes.

It is often desirable to have available a cation sensitive glass electrode such as a glass pH electrode having a restricted or even a very minute area which is the sole area that is sensitive and in which the remaining area of the electrode is desensitized or insulated. The insulation must be such as to minimize the tendency of the electrode to pick up water or other solvents which would result in destroying the effectiveness of the electrode or give rise to faulty or erroneous reading. One specific example of the need for such a glass electrode is the determination of pH existent within the interiors of single living cells which requires a glass pH electrode having a pH sensitive probe area approximately 1 micron in diameter and 10 microns in length.

It is known in the art to desensitize or insulate such glass electrodes by the partial coating of the glass electrodes with organic insulating material such as asphaltic materials and polymerized silicones. However, these materials do not bond well to the electrode glass and tend to pick up water to form a short or shunt which destroys the effectiveness of the electrode or results in faulty and erroneous observations. I have described previously in my U.S. Patent No. 3,129,160 an improved method for desensitizing selected areas of glass electrode surfaces by treating the surfaces with silver or copper salts or mixtures thereof. By heating the ion sensitive glass contacted by said salts, a desensitizing of the glass occurs, the magnitude of the desensification being dependent upon the amount of heat and period of time for which it is applied to the coated electrode.

It is the principal object of the present invention to provide an improved cation sensitive glass electrode having selected insulated or densensitized areas in which said areas have a higher electrical and chemical resistance and are more easily produced than any known insulated electrodes.

Another object of the invention is to provide an improved cation sensitive glass electrode having selected insulated areas in which the areas are very durable in nature and are not subject to deterioration, absorption of water or other solvents, or other responses affecting the verity of the readings observed.

Still a further object of the invention is to provide an improved cation sensitive glass electrode and method of producing the same wherein the electrode is coated with an insulating material and then the sensitivity of selected areas of the electrode may be restored by subsequent treating steps or manipulations.

An additional object of the invention is to seal and insulate a glass electrode in a hypodermic needle in situ.

According to the principal aspect of the present invention, a cation sensitive glass electrode is produced having a selected area of its outer cation sensitive surface coated with a fused glaze which provides an insulating casing or coating for the electrode. The fused coating is applied to the ion sensitive glass by contacting the glass with suitable glaze and subjecting the glass contacted by the glaze to sufficient heat and for sufficient period of time to fuse the glaze and cause it to be adhered to the glass electrode.

According to another aspect of the invention, a cation sensitive glass electrode is mounted in a hypodermic needle by coating a tube of the glass with a glaze, inserting the coated tube in the needle and heating the assembly to fuse the glaze and thereby seal the tube in the needle and insulate the tube in situ.

Other objects, aspects and advantages of the invention will become more apparent from the following description taken in connection with the accompanying drawing which shows the electrode of the invention mounted in a hypodermic needle, on enlarged scale.

The novel coating of the present invention utilized to insulate or, in other words, desensitize the outer cation sensitive surface of a glass electrode will be referred to hereinafter as a "fused glaze." The glaze from which the fused glaze is formed is produced by first forming a molten magma of a glass-like material and by pouring the magma into a cool container so that it will break up into small pieces, generally referred to as "frit." The frit thus formed is then finely divided in a ball mill to produce what is known in the art as a "glaze." The glaze is then applied to the outer surface of an ion sensitive glass, preferably with the glaze being suspended in a liquid vehicle, and thereafter the glaze-coated electrode is fired in an oven to fuse the glaze and adhere the same to the glass surface.

For insulating or desensitizing the ion sensitive surface of the glass electrode, it is desirable that the glaze have the following characteristics:

(1) A fusing point about the same as or, preferably, below the deformation point of the ion sensitive glass.
(2) A high chemical resistance, particularly in the acid range, which is particularly necessary in biological applications of the electrodes.
(3) A coefficient of linear expansion slightly less than that of the ion sensitive glass so that firing of the glaze onto the glass surface will not result in a decrease in mechanical strength but actually increases the mechanical strength of the electrode.

In addition it is desirable that glass electrodes coated with the glaze have a high electrical resistance on the order om $10^{11}$ ohms. I have found that a lead borosilicate titanium glaze has all of the aforementioned desirable characteristics. Without being limited to any specific theory, it is believed that the high electrical resistance and other desirable characteristics obtained by the aforementioned glaze material is due primarily to the high degree of crystalline structure within the glaze, which is believed to result from a relatively high content of titanium dioxide in the glaze. It is also believed that the high content of itanium dioxide increases the acid resistance of the material.

A suitable composition of a lead borosilicate titanium glaze for Corning No. 0150 pH sensitive glass is one containing, in weight percent calculated from the prefusion mixture, about 32–35 $SiO_2$, 25–30 PbO, 10–12 $B_2O_3$, 4–6 $Na_2O$, 5–7 $K_2O$, 0–1.5 $CaF_2$ and 13–15 $TiO_2$. The glaze may also contain a small amount of CoO, for example, up to about .3%.

Compositions falling within the above ranges have been formed into glaze by fusing the constituents in a Denver Fire Clay crucible over an open natural gas oxygen flame until a molten, bubble-free homogenous magma is produced. The molten magma was then poured into a stainless steel container cooled in water thus causing the magma to solidify into small pieces of glass, referred to as frit. Thereafter, the frit was finely divided in a ball mill to produce the glaze.

It is preferable to apply the glaze to the glass in the form of a paste or slurry by suspending the glaze in a liquid vehicle such as turpentine. The mixture may be applied by means of brushing, dipping, spraying or in any other desirable manner and then the coated electrode is heated at a sufficient temperature to fuse the glaze and cause it to adhere to the electrode. The insulation produced on the ion sensitive glass and the degree of inhibition of pH sensitivity is a function of the coating thickness and dependent upon the duration of heating, the temperature at which the heating is carried out, and can be further extended by repeating the glazing treatment.

Selected areas of the ion sensitive glass electrode may be coated, or the entire electrode surface may be coated and the desired pH sensitivity of an area or areas restored by etching said areas with hydrofluoric acid, or by selective grinding and polishing operations to remove the insulating coating at the desired point or points. Hence, by the invention cation sensitive electrodes may have selected surfaces insulated totally or only partically to reduce the sensitivity of the electrode.

Generally speaking, the glaze should have a fusing point of about the same as or less than the deformation point of the cation sensitive glass to which it is applied so that the glaze may be fused without the glass deforming. When utilizing the glaze described above, it is desirable to heat the glaze applied to an ion sensitive glass to about 600 to 650° C. for approximately ten minutes or more and preferably for about 10 minutes to produce an insulating coating having the desired high electrical and chemical resistance.

By way of example, a lead borosilicate titanium glaze as described above has been applied to a Corning No. 0150 pH sensitive glass capillary by suspending the glaze in turpentine to produce a paste and applying the paste by a thin brush to the ion sensitive glass. The coated glass capillary was then inserted in an electric furnace which was heated to about 575–600° C. until the glaze matured into a cobalt blue color. Capillaries coated with such a glaze were found to have adequate acid resistance but only a fair electrical resistance, namely, about $10^{10}$ ohms. However, when the glaze coated capillaries were heated to temperatures between about 600° and 650° C., and particularly the latter, the color of the glaze changed to an olive green to yellow color, which is presumed to result from the crystallization of titanium dioxide in the glaze. Under these circumstances, both the acid resistance and electrical resistance of the glaze dramatically increased, the electrical resistance being about $10^{11}$ ohms. It is noted that the 650° C. applied in the method just described is somewhat above the specified deformation point for the Corning No. 0150 glass, which is about 625° C. However, it was possible to quickly apply the 650° C. to glaze capillaries of one millimeter in diameter down to 0.5 millimeter diameter without significant deformation of the capillaries.

With a one millimeter diameter capillary of Corning No. 0150 pH sensitive glass coated with the glaze described above to about 650° C., it was found that the completely coated capillary produced potential readings with a high impedance electrometer of +30 millivolts for a pH buffer 7 and +36 millivolts for a pH buffer 4. In each case, the measured resistance of the external circuit, wheich is due primarily to the fused glaze on the capillary, was on the order of $10^{11}$ ohms. When a portion of the fused glaze on the same capillary in which the above readings were obtained was removed by means of a Carborundum stone over a one millimeter area from the tip of the capillary, the following readings were obtained: +95 millivolts for a pH buffer 7 and +235 millivolts for a pH buffer 4, thus yielding a 140 millivolt change over a 3 pH range. The resistance of the capillary electrode was on the order of $10^{10}$ ohms.

It has been found, however, that by soaking the exposed ion sensitive portion of the capillaries in distilled water a significant decrease of the resistance of the glass occurs with a resulting increase of the millivolt response of the electrode to change in ion concentration. On occasion, a completely glazed capillary has been found to yield an electrical resistance in excess of $10^{11}$ ohms and readings have been obtained in pH 4 and pH 7 buffers which were irregular as might occur in an open circuit. With such an electrode, when a one millimeter length was etched free of glaze by hydrofluoric acid, the pH sensitivity of the etched area was restored, as indicated by the following readings: +54 millivolts for a pH 7 buffer and +200 millivolts, for a pH 4 buffer, thus yielding a 146 millivolt change over a 3 pH range. The millivolt response, therefore, for each decade of change in ion concentration is approximately 50 millivolts, which approaches the theoretical Nerst response of approximately 60 millivolts. This clearly illustrates that by the present invention there is provided a successful means for insulating ion sensitive glass electrodes and leaving small sensitive portions which are capable of measuring pH with substantial theoretical response.

The combination of the above described glazed and Corning No. 0150 pH sensitive glass has also been used to produce pH sensitive micro glass electrodes. To make a microelectrode, a tube of Corning No. 0150 glass was drawn to a capillary with an outside dimension of from between 0.6 and 0.8 mm. The wall thickness was approximately 0.15 to 0.2 mm. The glaze was suspended in turpentine and applied to the capillary with a brush in such a manner that the fired glaze had a thickness on the capillary of from 0.02 to 0.03 mm. The capillary was then glazed in an electric furnace at 650° C. as described before and was then placed in a commercially available micro pipette electrode puller and a tapered tip was then pulled. The tip thus formed was cation sensitive, but it is not known whether this was due to a stretching out of the treated area or the pulling out of an untreated layer of glass from beneath the glazed capillary, however, it is believed that the latter is the case. The over-all length of the taper was about 6.5 millimeters and due to the small dimensions of the capillary utilized, the end of the tip was closed so that not further treatment was required to close the electrode. After the electrodes were pulled, they were filled with distilled water under vacuum and heat. Afterwards, the distilled water was displaced with a solution of 2 molar KCl plus 0.5 molar $KNO_3$ by means of a small polyethylene tube connected to a reservoir of the solution. Before testing the electrodes, they were soaked in distilled water for a period of time varying between 7 and 14 days in order to rehydrate the tips, thus lowering their resistance and reestablishing full ion sensitivity. The electrodes were found to produce a millivolt response somewhat less than theoretical Nerst response, on the order of 50 millivolts, and with an external circuit resistance of approximately $5 \times 10^9$ ohms. It was concluded that the sensitive portion of the electrode existed from a distance of 5 to about 15 microns from the tip of the electrode. The tip itself was slightly less than 1 micron at the end of the pH sensitive area.

It is to be understood that the invention is not limited to the specific glaze composition described above for desensitizing or insulating ion sensitive glasses, but other glazes may be utilized if they have the characteristics described previously of high chemical and electrical resistance and a fusing point about the same as or less than the deformation point of the pH sensitive glass. For example, a commercially available glaze sold under the trade name of Pemco TR–514–A has been found to be suitable for performing the present invention. It has been found that ion sensitive capillary tubes coated with the Pemco glaze, when heated in an oven at about 600° C. for ten minutes, became completely insulated. Microelectrodes were formed from such capillary tubes, in accordance with the method described previously, with the result that the electrodes produced about 45 to 55 millivolts per pH unit change, thus approaching the theoretical Nerst value of 60 millivolts.

The invention also contemplates the mounting of a cation sensitive glass electrode in a hypodermic needle whereby in vivo cation concentration measurements may be made in living subjects. Such an assembly is shown in the drawing and is referred to generally by numeral 10. The assembly comprises a conventional stainless steel hypodermic needle 12 having a passage 14 extending therethrough in which the glass electrode 16 is positioned. The glass electrode comprises a cation sensitive glass capillary tube 18 closed at its lower end 20 which is located at the open end 22 of the needle for exposure to sample medium. The interior of the tube 18 is filled with a suitable electrolyte 24 in which there is immersed an internal half-cell 26. The half-cell 26 preferably is in the form of a silver wire coated with silver chloride. The half-cell extends to the upper end 28 of the tube 18 and passes through a passage 30 of the hub 32 of the needle for connection to an external circuit, such as a pH meter, not shown. The upper end of the tube 18 and the half-cell 26 in the passage 30 are secured and insulated therein by a suitable epoxy material 34 filling the passage 30.

As seen in the drawing, the cation sensitive glass tube 18 is positioned coaxially within the needle passage 14 to provide an annular passage which is filled with a fused glaze 36. The glaze seals the cation sensitive glass tube 18 within the needle and is fused to the outer surface of the tube except for the closed end 20 thereof, thereby fully insulating the glass tube and leaving a sensitive end for contact with a sample medium.

The assembly illustrated in the drawing is made by closing the end of a cation sensitive glass tube and painting the tube, in several successive thin coats, with a glaze suspended in a suitable liquid vehicle, as described hereinbefore, but leaving the closed end of the glass capillary tube clear of the glaze by masking the end of the tube. Each coating of the glaze is allowed to dry and successive coatings applied thereto until the diameter of the coated cation sensitive tube has essentially the same diameter as that of the passage 14 in the hypodermic needle so that a tight friction fit between the two parts will be obtained. Thereafter, the coated glass tube 18 is inserted into the passage 14 of the needle and the assembly positioned in a furnace which is brought up to the fusion temperature of the glaze to fuse the glaze and thereby seal the cation sensitive tube to the wall of the needle and insulate the tube in situ.

In an alternative method, the entire surface of the cation sensitive glass tube 18 is coated with the glaze, inserted in the passage 14 of the needle, and subsequently heated to fuse the glaze. Thereafter, a portion of the glaze at the closed end of the tube 20 is removed by using a Carborundum stone or by etching with hydrofluoric acid.

In one example, an assembly as shown in the drawing has been made by forming a capillary of Corning No. 0150 pH sensitive glass of sufficiently small diameter to fit within a 19 gauge stainless steel hypodermic needle. The glass tube was closed at its end by heating and Pemco TR–514–A glaze suspended in turpentine was applied to the tube, except for the closed end thereof, in successive layers until the diameter of the coated tube was sufficiently large so that the tube tightly fit within the opening of the hypodermic needle. The coated tube was inserted in the needle and the assembly heated to approximately 600° C. for about ten minutes. After cooling, a fused union between the glass tube, fused glaze and stainless steel needle was obtained, thereby providing a glass electrode mounted in a hypodermic needle having desirable mechanical strength. The glass tube was filled with potassium chloride solution and a chloridized silver wire was placed therein. It was found that the electrode mounted in said needle was capable of measuring pH with about seventy-five percent theoretical response.

By way of another example, a Corning No. 0150 pH sensitive glass capillary was coated with the Pemco glaze and insulated in situ in a 15 gauge hypodermic needle in accordance with the method described immediately above. The glass capillary was filled with a mixture of 0.5 molar potassium nitrate and 2.5 molar potassium chloride as the internal solution and a chloridized silver wire disposed therein to form the half-cell. The assembly was connected to a pH meter together with a calomel reference electrode and both electrodes inserted in pH buffer 4 and pH buffer 7 solutions. The differences in response between the readings in the two solutions averaged about 129 millivolts. Since the theoretical millivolt span over a three decade change in ion concentration is 177 millivolts, it is seen that the electrode mounted in the hypodermic needle produced substantial theoretical response.

In order to improve the structural strength and output of the electrode assembly shown in the drawing, it has been found desirable, when building up successive layers of glaze on the glass tube 18, to add a material of low softening point to the last several layers on the tube so that the final glaze coating is more compatible with the stainless steel needle. For example, a glass capillary has been sealed in a 15 gauge hypodermic needle by adding lead oxide to successive coatings of Pemco glaze to render the glaze softer and more compatible with the stainless steel needle. Over a span of 3 pH units between 7 and 4, the electrode assembly registered a difference of 154 millivolts, which was an improvement over the hypodermic electrode assemblies described above.

Although several embodiments of the invention have been disclosed herein for purposes of illustration, it is to be understood that various changes in the proportions and materials, as well as in the details of the described methods, may be made without departing from the spirit and scope of the invention as defined by the appended claims.

What is claimed is:

1. A cation sensitive glass electrode having a selected area of its outer cation sensitive glass surface coated with a fused insulating glaze.

2. A cation sensitive glass electrode having a selected area of its outer cation sensitive glass surface coated with a fused insulating glaze, said glaze being adhered to said surface by fusion.

3. A cation sensitive glass electrode having a selected area of its outer cation sensitive glass surface coated with a fused insulating glaze, said glaze having a fusing point about the same as or less than the deformation point of said cation sensitive glass.

4. A cation sensitive glass electrode having a selected area of its outer cation sensitive glass surface coated with a fused insulating glaze, said glaze being partially devitrified.

5. A cation sensitive glass electrode having a selected area of its outer cation sensitive glass surface coated with a fused insulating glaze, said glaze being a lead borosilicate titanium composition.

6. A cation sensitive glass electrode having a selected area of its outer cation sensitive glass surface coated with a fused insulating glaze, said glaze being a lead borosilicate composition containing, in weight percent calculated from the prefusion mixture, about 13–15 $TiO_2$ and about 9–13 of a mixture of alkali metal oxides.

7. A cation sensitive glass electrode having a selected area of its outer cation sensitive glass surface coated with a fused insulating glaze, said glaze having a composition comprising, in weight percent calculated from the prefusion mixture, $SiO_2$ about 32–35, PbO about 25–30, $B_2O_3$ about 10–12, $Na_2O$ about 4–6, $K_2O$ about 5–7, $CaF_2$ about 0–1.5 and $TiO_2$ about 13–15.

8. A method of insulating a selected area of a cation sensitive glass electrode comprising the steps of:
   contacting the selected area with an insulating glaze; and
   heating at least the selected area while in contact with the glaze to a sufficient temperature and for a sufficient time to fuse the glaze.

9. A method of insulating a selected area of a cation sensitive glass electrode comprising the steps of:
   contacting the selected area with an insulating glaze having a fusing point about the same as or less than the deformation point of the glass of said electrode; and
   heating at least the selected area while in contact with the glaze to the fusing point of said glaze whereby said glaze adheres to said area by fusion.

10. A method of insulating a selected area of a cation sensitive glass electrode comprising the steps of:
    contacting the selected area with an insulating glaze; and
    heating at least the selected area while in contact with the glaze to a temperature of about 600–650° C. for a period of time not less than approximately 10 minutes.

11. A method as set forth in claim 10 wherein said glaze is a lead borosilicate titanium composition.

12. A method of insulating a selected area of a cation sensitive glass electrode comprising the steps of:
    contacting the selected area with an insulating glaze suspended in a liquid vehicle; and
    heating at least the selected area while in contact with the glaze to a sufficient temperature and for a sufficient time to fuse the glaze.

13. A method of insulating a selected area of a cation sensitive glass electrode comprising the steps of:
    producing a lead borosilicate titanium frit;
    finely dividing the frit into an insulating glaze;
    suspending the glaze in a liquid vehicle;
    contacting the selected area with said liquid vehicle containing the glaze; and
    heating at least the selected area while in contact with the glaze to a temperature of about 600–650° C. for a period of time not less than approximately 10 minutes.

14. A method of insulating a selected area of a cation sensitive glass electrode comprising the steps of:
    contacting the selected area with an insulating glaze;
    heating at least the selected area while in contact with the glaze to a sufficient temperature and for a sufficient time to fuse the glaze; and
    removing a portion of the fused glaze from said selected area.

15. A method of insulating a selected area of a cation sensitive glass electrode comprising the steps of:
    contacting the cation sensitive glass of the electrode with an insulating glaze;
    heating at least the selected area while in contact with the glaze to a sufficient tempertaure and for a sufficient time to fuse the glaze; and
    then exposing an area of said cation sensitive glass other than said selected area.

16. A composition for insulating cation sensitive glass electrodes comprising in weight percent calculated from the prefusion mixture, $SiO_2$ 32–35, PbO 25–30, $B_2O_3$ 10–12, $Na_2O$ 4–6, $K_2O$ 5–7, $CaF_2$ 0–1.5 and $TiO_2$ 13–15.

17. The method of at least partially insulating a selected area of a cation sensitive glass electrode comprising the steps of:
    contacting the selected area with an insulating glaze; and
    heating at least the selected area while in contact with the glaze to a sufficient temperature and for sufficient time to at least partially fuse the glaze.

18. An electrochemical electrode assembly comprising:
    a hypodermic needle having a passage therethrough;
    an elongated tube of cation sensitive glass positioned coaxially in said passage and spaced from the walls thereof to define an annular space, said tube having one end closed and exposed at one end of said passage in said needle;
    a fused insulating glaze filling said annular space to insulate said glass tube and retain said tube in said needle passage, said fused glaze coating said glass tube except for said closed end thereof; and
    an internal half-cell disposed in said glass tube for contacting electrolyte therein and said internal half-cell extending through the other end of said tube for connection to an external circuit.

19. An electrochemical electrode assembly as set forth in claim 18 wherein said fused glaze is adhered to said glass tube by fusion and sealed to the wall of said needle passage.

20. A method of sealing and insulating an elongated cation sensitive glass tube in a passage of a hypodermic needle comprising the steps of:
    closing one end of said glass tube;
    coating said glass tube, except for said one end thereof, with an insulating glaze until the diameter of said glaze coated tube is substantially the same as the diameter of said needle passage;
    inserting said glaze coated tube in said needle passage with said closed end of said tube being exposed at one end of said needle passage; and
    heating the assembly to a sufficient temperature and for a sufficient time to fuse the glaze thereby sealing said glass tube in said needle passage and insulating said glass tube except for said one end thereof.

21. A method of sealing and insulating an elongated cation sensitive glass tube in a passage of a hypodermic needle comprising the steps of:
    closing one end of said glass tube;
    coating said glass tube with an insulating glaze until the diameter of said glaze coated tube is substantially the same as the diameter of said needle passage;
    inserting said glaze coated tube in said needle passage with said closed end of said tube being exposed at one end of said needle passage;
    heating the assembly to a sufficient temperature and for a sufficient time to fuse the glaze thereby sealing said glass tube in said needle passage and insulating said glass tube; and
    removing a portion of the fused glaze from said one end of said glass tube.

References Cited

UNITED STATES PATENTS

| | | | |
|---|---|---|---|
| 2,507,691 | 5/1950 | Coffeen et al. | 106—49 |
| 2,590,893 | 4/1952 | Sanborn | 106—49 |
| 2,691,855 | 10/1954 | Armistead | 106—39 |
| 2,844,693 | 7/1958 | Rigterink | 106—49 |
| 3,000,745 | 9/1961 | Cianchi | 106—53 |
| 3,129,160 | 4/1964 | Carter | 204—195.1 |
| 3,189,677 | 6/1965 | Anthony et al. | 106—53 |
| 3,224,436 | 12/1965 | LeMassena | 204—195 |

HOWARD S. WILLIAMS, *Primary Examiner.*

T. TUNG, *Assistant Examiner.*

U.S. Cl. X.R.

204—1; 106—39, 49, 53, 54; 65—60, 102